United States Patent

Takagi et al.

[11] Patent Number: 5,805,740
[45] Date of Patent: Sep. 8, 1998

[54] BAR-CODE FIELD DETECTING APPARATUS PERFORMING DIFFERENTIAL PROCESS AND BAR-CODE READING APPARATUS

[75] Inventors: Nobuaki Takagi, Yokohama; Seietsu Nara, Miura; Yoshikatu Nakamura, Yokosuka, all of Japan

[73] Assignee: Kabushiki Kaisha Toshiba, Kawasaki, Japan

[21] Appl. No.: 966,710

[22] Filed: Nov. 10, 1997

Related U.S. Application Data

[63] Continuation of Ser. No. 515,043, Aug. 14, 1995, abandoned.

[30] Foreign Application Priority Data

Sep. 28, 1994 [JP] Japan .................................. 6-232713

[51] Int. Cl.⁶ .............................. G06K 9/42; G06K 9/44; G06K 9/36; G06K 9/34
[52] U.S. Cl. .......................... 382/257; 235/462; 382/174; 382/199; 382/258; 382/291
[58] Field of Search ....................... 382/181, 183, 382/184, 199, 200, 205, 187, 168, 171, 174, 175, 177, 178, 179, 257, 258, 273, 275, 137, 139, 103, 291, 299, 256; 235/462, 463

[56] References Cited

PUBLICATIONS

Tsuchiya, et al: "A Method for Bar Code Recognition in Raster–Scanned Images", PROCEEDINGS OF THE 1989 IEICE SPRING CONFERENCE, D–527 Partial.

*Primary Examiner*—Bipin Shalwala
*Attorney, Agent, or Firm*—Cushman Darby & Cushman IP Group of Pillsbury Madison & Sutro LLP

[57] ABSTRACT

A bar-code field detecting apparatus first differentiates, in X and Y directions, image data of a document including a bar code, the position of which is not determined. It then expands each of the differential images in the direction opposite to the direction in which the image data is differentiated. Expanded images are subjected to bar-code field detection.

8 Claims, 10 Drawing Sheets

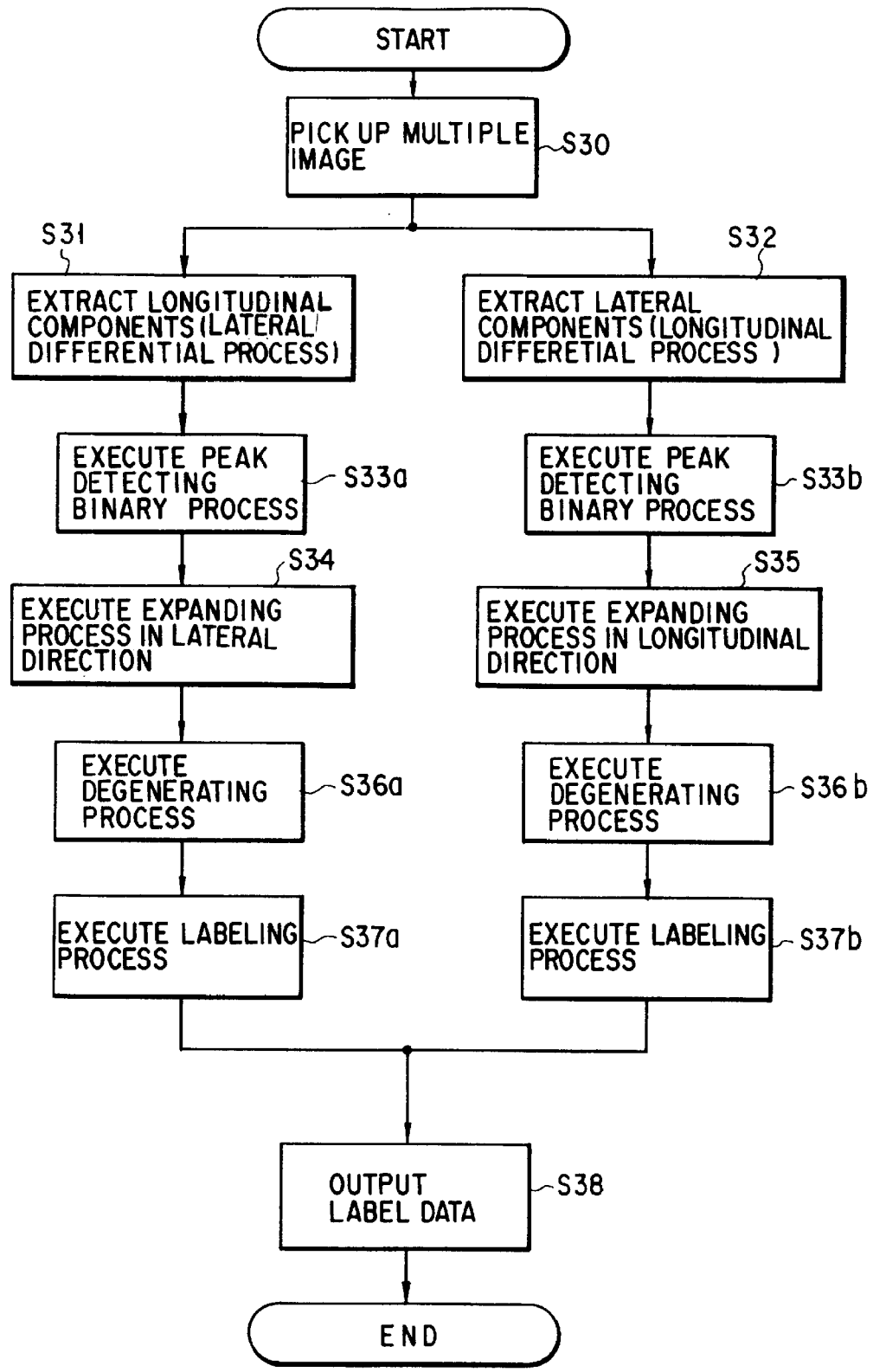
F I G. 2

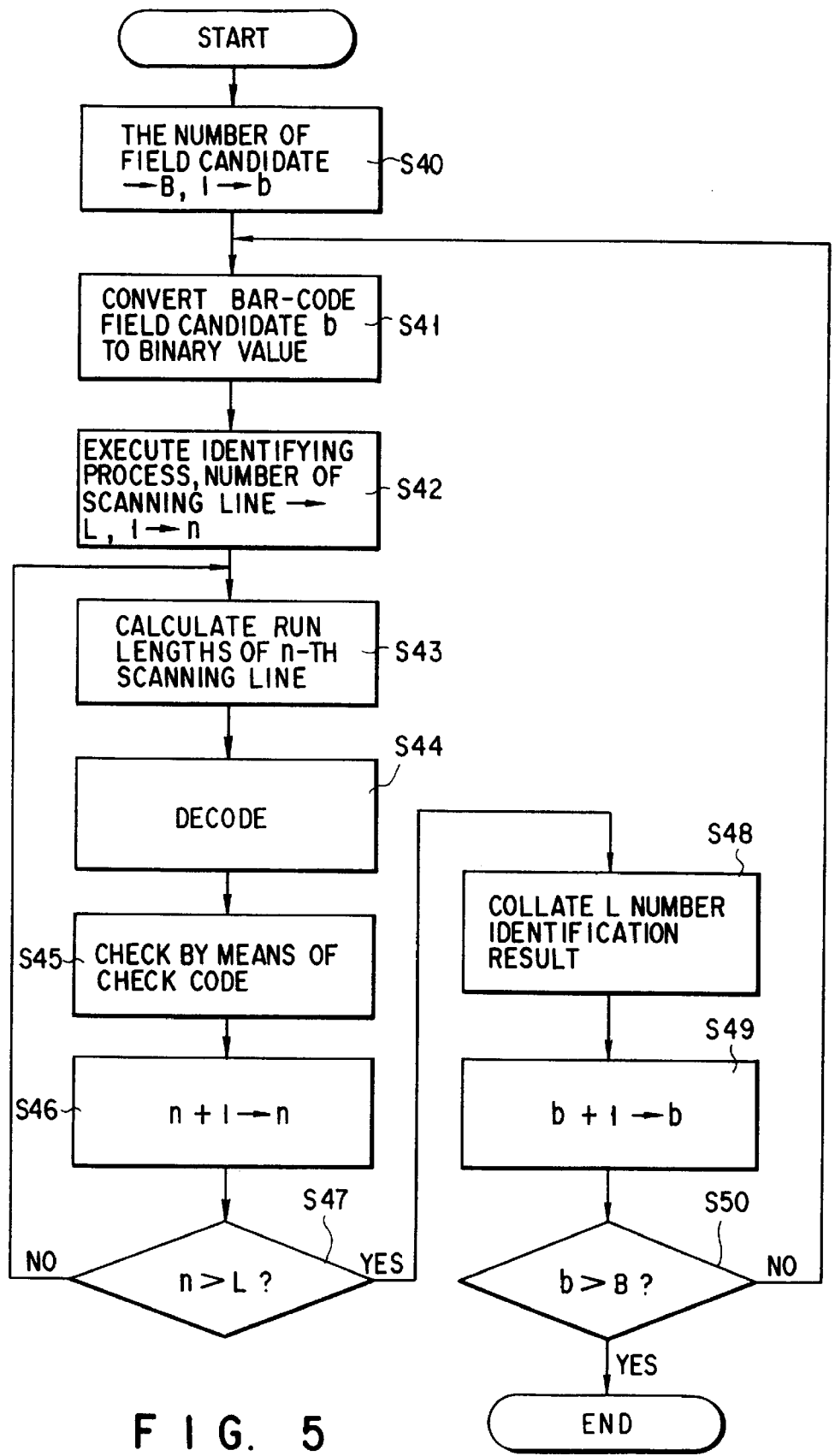
F I G. 5

BAR-CODE FIELD DETECTING APPARATUS PERFORMING DIFFERENTIAL PROCESS AND BAR-CODE READING APPARATUS

This is a continuation of application Ser. No. 08/515,043, filed on Aug. 14, 1995, which was abandoned upon the filing hereof.

BACKGROUND OF THE INVENTION

1. Field of the Invention

The present invention relates to a bar-code reading apparatus for optically reading a bar code on, for example, mail.

2. Description of the Related Art

Currently, article management using bar codes is common in the fields of currency, production, distribution and service. In these fields, conventionally, bar codes such as, JAM, ITF, Code 128, Code 39 and NW 7, have been used.

In a bar code consisting of black bars and white bars interposed between adjacent black bars, information is given to a bar width, so that one character is formed of a combination of thick and thin black bars and white bars. Further, a bar code has at least one check code, so that a reliability of a decoding process can be improved.

There are a number of methods for reading a bar code printed on various goods. For example, a method of scanning a bar code by means of a pen-type scanner in a direction perpendicular to bars, thereby decoding the code and a method of bringing a touch scanner having a CCD sensor close to a bar code, thereby decoding the code, are widely utilized.

A bar-code reading apparatus using laser beams, which variously emits laser beams by operating a mirror, so as to read a bar code in a predetermined range, is also available. Such an apparatus is utilized in a register of a supermarket.

For example, as shown in FIGS. 12 and 13, a label 1, printed with a bar code of NW7, is attached to a registered mail P. A position where the label is attached is not generally determined. Accordingly, labels may be adhered in longitudinal and lateral directions on the mail P. FIG. 12 shows a case in which the label 202 is attached to the mail P in the longitudinal direction, and FIG. 13 shows a case in which the label 202 is attached to the mail P in the lateral direction.

When bar codes, printed on labels attached in various directions to documents, are to be read at a high speed in a batch process, the above methods are disadvantageous in that a person must point out every bar code using the aforementioned pen-type scanner or touch scanner, since a considerable period of time is required.

SUMMARY OF THE INVENTION

An object of the present invention is to provide a bar-code field detecting apparatus for detecting a bar-code field easily and reliably, to read a bar code which may be attached to various positions on a document, and also to provide a bar-code reading apparatus for reading a bar code at high speed and high accuracy by means of the field detection.

According to the present invention, there is provided a bar-code field detecting apparatus comprising: means for receiving image data including a bar code; first differential means for differentiating, in a first direction, the image data received by the receiving means; second differential means for differentiating, in a second direction perpendicular to the first direction, the image data received by the receiving means; first expanding means for expanding the image data differentiated by the first differentiating means in the first direction by a first predetermined amount; second expanding means for expanding the image data differentiated by the second differentiating means in the second direction by a second predetermined amount; and means for detecting a position of the bar code based on the image data expanded by the first and second expanding means.

According to the present invention, there is also provided a bar-code reading apparatus comprising the above bar-code field detecting apparatus and bar-code recognizing means.

The bar-code field detecting apparatus of the present invention differentiates an input image in longitudinal and lateral directions, when a bar-code field is to be detected. Each of the differentiated images is expanded in a direction perpendicular to the direction in which the image has been differentiated, so that the bar-code image forms a rectangular black image. With this apparatus, the bar-code image can easily be distinguished from image data having an undefined format, such as an address, and a bar-code field of mail, including a bar code at an undefined position, can reliably be detected.

The bar-code reading apparatus of the present invention can stably read a bar code, due to the reliable bar-code field detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flowchart for explaining a process in an image characteristic extracting section;

FIG. 5 is a flowchart for explaining a bar-code identifying process;

DETAILED DESCRIPTION OF THE PREFERRED EMBODIMENTS

An embodiment of the present invention will be described with reference to the accompanying drawings.

Figure 1:
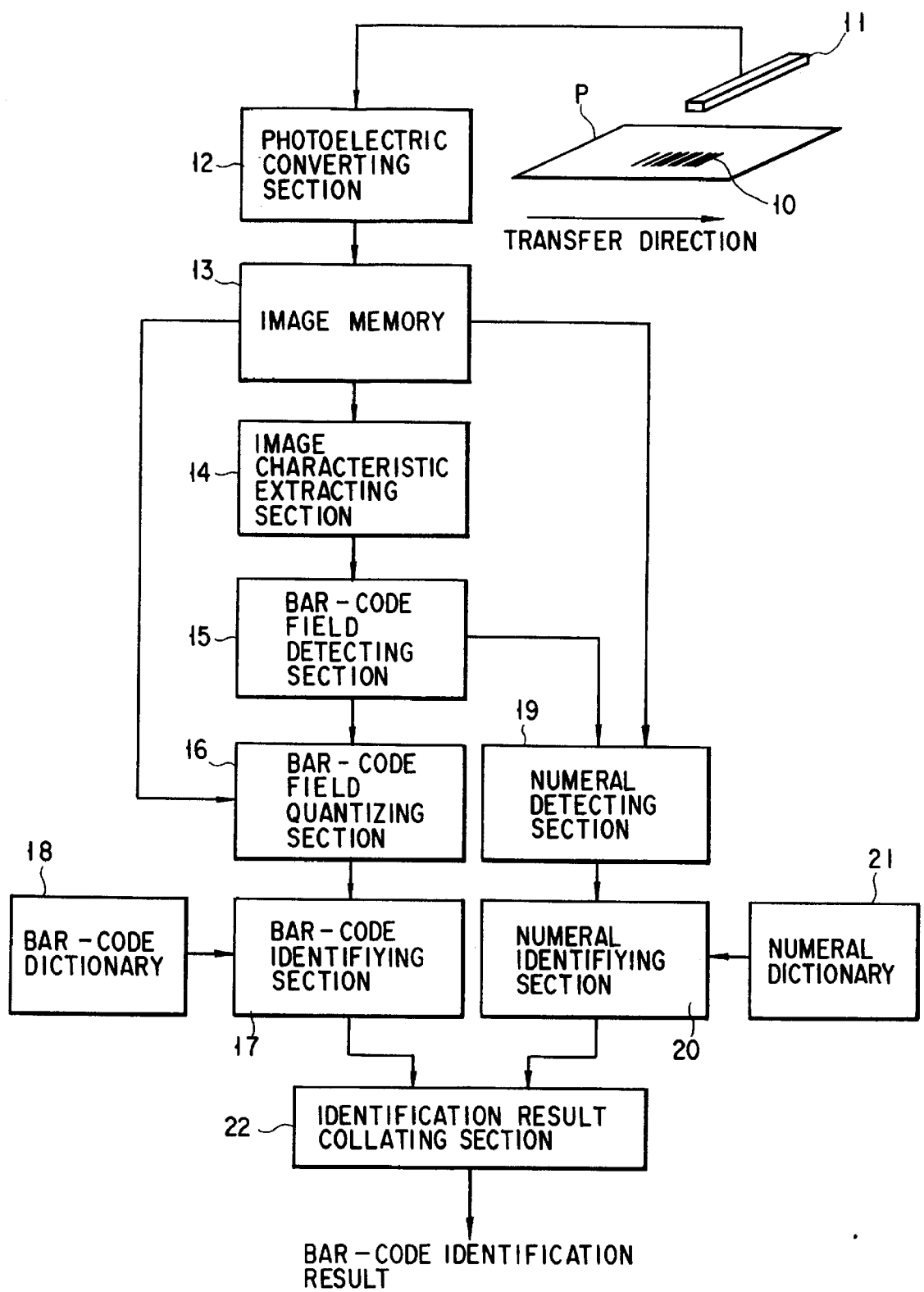
FIG. 1 is a block diagram showing a bar-code reading apparatus according to an embodiment of the present invention.

FIG. 1 schematically shows a bar-code reading apparatus according to the embodiment. The bar-code reading apparatus comprises a CCD line sensor 11 functioning as image pickup means, a photoelectric converting section 12, an image memory 13 functioning as image storing means, an image characteristic extracting section 14, a bar-code field detecting section 15, a bar-code field quantizing section 16, a bar-code identifying section 17, a bar-code dictionary 18, a numeral detecting section 19, a numeral identifying section 20, a numeral dictionary 21, and an identification result collating section 22.

Functions of the above sections will be described below.

An object (for example, a document) to which a bar code is attached, i.e., a mail P to which a bar code 10 is attached, is transferred in the direction indicated by an arrow shown in FIG. 1 through a transfer path (not shown). An image on the transferred mail P is photoelectrically converted by the line sensor 11, which outputs an analog signal (image signal) corresponding to the overall image on the mail P.

The image processing section 12 receives the analog signal output from the line sensor 11. The analog signal input to the section 12 is subjected to amplifying, emphasizing and A/D converting processes, so that digital image data as a pickup image is obtained.

The image memory 13 temporarily stores the digital image data output from the image processing section 12.

The image characteristic extracting section 14 extracts an image characteristic for detecting a field, in which the bar code 10 is present, from the overall image on the mail P, on the basis of the pickup image in the image memory 13. The image characteristic extraction will be described later in detail.

The bar-code field detecting section 15 detects the field, in which the bar code 10 is present, based on the image characteristic obtained by the image characteristic extracting section 14, and outputs coordinates.

The bar-code field quantizing section 16 obtains an optimal binary threshold value for separating a bar-code portion from a background of an image of the bar-code field detected by the bar-code field detecting section 15, and outputs a binary image of the bar-code field.

The bar-code identifying section 17 receives the binary image of the bar-code field obtained by the bar-code field quantizing section 16. It obtains the length of a bar from the binary image, identifies the bar by comparing it with patterns registered in the bar-code dictionary 18, and outputs an identification result.

In the bar-code dictionary 18, combinations of bar lengths of bar codes and numerals or symbols corresponding to the combinations are registered. The bar-code dictionary is used to identify a bar code by means of the bar-code identifying section 17.

The numeral detecting section 19 receives the image of the bar-code field obtained by the bar-code field detecting section 15. It detects and separates numerals, representing the contents of a bar code, from a region adjacent to the bar-code field, and outputs the numerals separately as character image data.

The numeral identifying section 20 receives the character image data detected by the numeral detecting section 19. It compares the data with standard patterns stored in the numeral dictionary, thereby identifying the data, and outputs an identification result.

The numeral dictionary 21 stores standard patterns of 10 characters of "0" to "9".

The identification result collating section 22 receives the identification result of the bar code obtained by the bar code identifying section 17 and the numeral identification result obtained by the numeral identifying section 20. The section 22 collates these identification results and outputs a final bar-code identification result.

A process in the image characteristic extraction section 14 will be described in detail with reference to the flowchart shown in FIG. 2.

First, a multiple image, on the overall surface of the mail P having a bar code, stored in the image memory 13 is picked up (S30). Next, using, for example, a 3×3 sobel operator, the multiple image is subjected to a lateral differential process (S31) for extracting longitudinal components of the image, at the same time, to a longitudinal differential process (S32) for extracting lateral components of the image.

Figure 3:
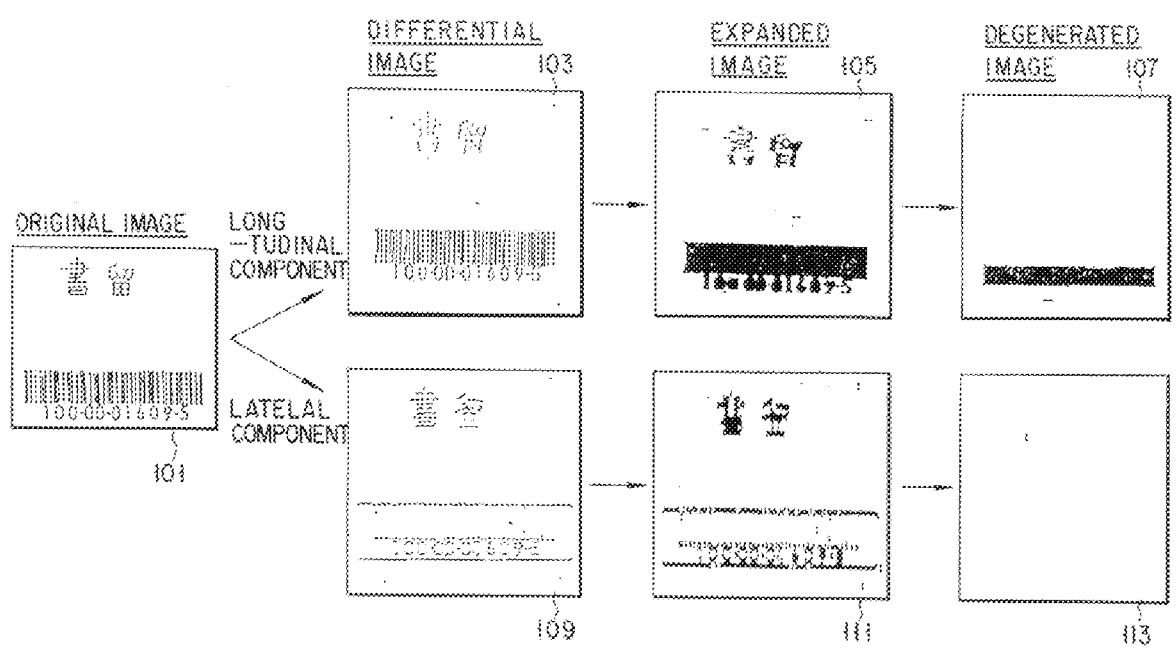
FIG. 3 is a diagram showing examples of various images processed in the image characteristic extracting section, in a case where a bar code is printed in a lateral direction.
Figure 4:
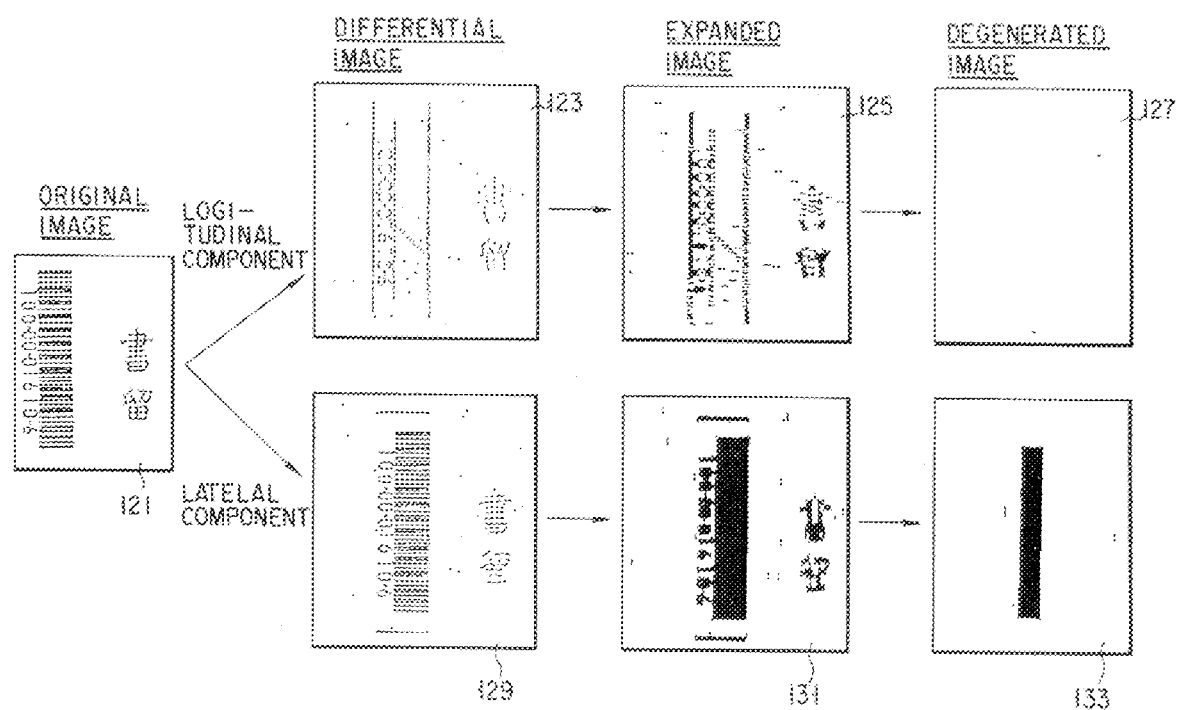
FIG. 4 is a diagram showing examples of various images processed in the image characteristic extracting section, in a case where a bar code is printed in a longitudinal direction.

Examples of differential images obtained by the differential processes (S31, S32) are shown as differential images 103 and 109 in FIG. 3 and differential images 123 and 129 in FIG. 4. The differential images 103 and 109 correspond to an original image 101 shown in FIG. 3 and the differential images 123 and 129 correspond to an original image 121 shown in FIG. 4. FIG. 3 shows a case in which a bar code extends in a lateral direction and FIG. 4 shows a case in which a bar code extends in a longitudinal direction.

As described above, in some cases, bar codes are attached to mails P in the lateral direction, and in the other cases, they are attached in the longitudinal direction. The bars of the bar codes, extending both in longitudinal and lateral directions, can be reliably extracted by subjecting input images to differential processes in the two directions.

Next, a maximum peak point of change in density of each of the differential images obtained by the differential processes (S31, S32) is detected, and a peak detecting binary process, for assigning the peak point "1", is performed (S33a, S33b). Only one pixel can be detected as an edge by each of the processes (S33a, S33b).

Subsequently, each of the binary images obtained by the peak detecting binary processes (S33a, S33b) is subjected to an expanding process in a direction perpendicular to the edge (S34, S35). More specifically, with regards to the differential image in the lateral direction, a black pixel is added in the lateral direction to every pixel in the edge portion, thereby executing an edge thickening process (S34). With regards to the differential image in the longitudinal direction also, a black pixel is added in the longitudinal direction to every pixel in the edge portion, thereby executing an edge thickening process (S35).

Expanded images obtained by the expanding processes (S34, S35) are shown as expanded images 105 and 111 in FIG. 3 and expanded images 125 and 131 in FIG. 4. The expanded images 105, 111, 125 and 131 shown in FIGS. 3 and 4 are obtained by respectively expanding the differential images 103, 109, 123 and 129 shown in FIGS. 3 and 4.

Each of the expanding processes (S34, S35) is performed once or repeated several times, until the bars are connected with each other, so that all the bars of the bar code forms one continuous black region. In other words, the expanding process is performed so that the largest white pixel between black bars is turned to black. In this manner, since the bar-code field is turned to a continuous black region (bar-code connected region) 105 or 131, a bar-code field can be extracted easily.

In the lateral direction expanding process (S34) or the longitudinal direction expanding process (S35), not only a bar image but also the other images are expanded. For this reason, if there is any other images, such as a letter or a symbol, near the image of the bar code, the other images may be connected to the bar code image as a result of the expanding process.

In order to separate the other images from the image of the bar-code connected region, the expanded image obtained by each of the expanding processes (S34, S35) is subjected to a degenerating process (S36a, S36b) for removing one black pixel in the edge portion of the image. Each degenerating process (S34, S35) is performed once or repeated several times, thereby removing the image other than the bars from the image of the bar-code connected region.

The degenerated images obtained by the degenerating processes (S36a, S36b) are shown as degenerated images 107 and 113 in FIG. 3 and degenerated images 127 and 133 in FIG. 4. The degenerated images 107, 113, 127 and 133 are obtained by respectively degenerating the expanded images 105, 111, 125 and 131 shown in FIGS. 3 and 4.

The degenerating processes (S36a, S36b) are not limited to the above processes in which one black pixel is removed from the edge portion of an image. That is, a degenerating process can be achieved by removing several black pixels from the edge portion.

In the degenerated images 107, 113, 127 and 133 obtained by the degenerating processes (S36a, S36b), only the bar-code field is a continuous component. The degenerated images 107, 113, 127 and 133 are then subjected to labeling processes (S37a, S37b) to extract the continuous component as a label. Label data obtained as a result of the labeling processes (S37a, S37b) is output to the bar-code field detecting section 15 (S38).

The bar-code field detecting section 15 detects a label having a size suitable for a bar code is detected as the bar-code field. More specifically, the region, having a length and a width within allowable ranges of those of a label, is detected as the bar-code field.

A process of identifying the bar-code field, obtained by the aforementioned processes, will be described in detail with reference to the flowchart shown in FIG. 5.

First, the number of bar-code field candidates detected by the bar-code field detecting section 15 is represented as "B" and the value of a bar-code field counter b is set to "1" (S40). Subsequently, with respect to a b-th candidate of the bar-code field detected by the bar-code field detecting section 15, a histogram of the density in the bar-code field is obtained. The density at the trough of the histogram is obtained as a binary threshold value. The image of the bar-code field candidate b is processed to a binary image (S41).

Assume that an L-number of scanning lines of all the scanning lines in the direction perpendicular to the bar code are used in a bar-code identifying process. In this embodiment, the bar-code identifying process is performed by using, for example, three scanning lines (L=3). The value of the scanning line counter n is set to "1" (S42).

In a case where three scanning lines are used, i-th, j-th and k-th scanning lines, arranged, for example, so as to quarter the length YL of a bar, are utilized to identify the bar code. First, the lengths of black runs and white runs on the i-th scanning line (line i) are calculated (S43).

Figure 6:
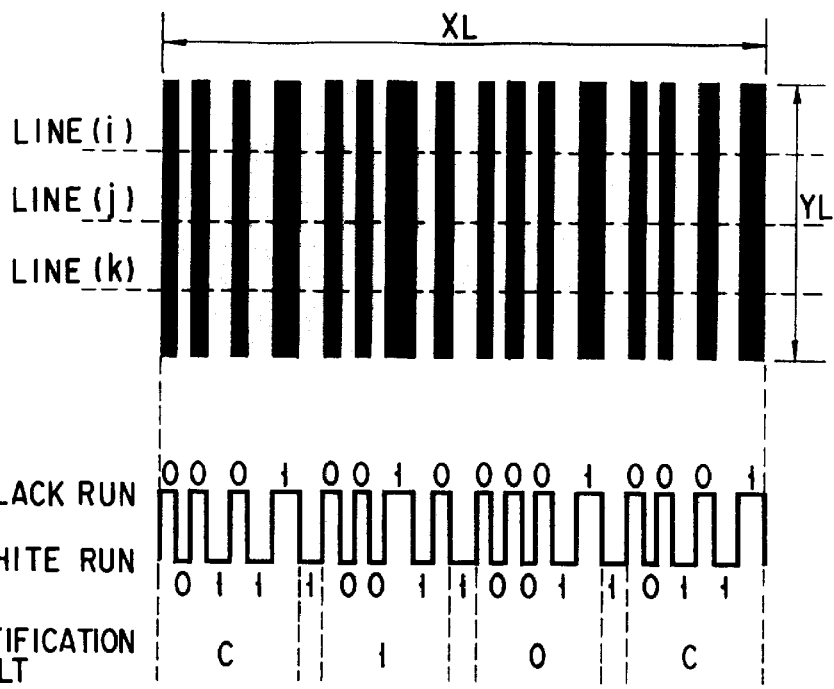
FIG. 6 is a diagram for explaining a bar-code identifying process.

With respect to the run lengths of black and white runs on the i-th scanning line obtained in the process S43, a run having a length equal to or shorter than a threshold value is represented as "0" and a run longer than the threshold value is represented as "1". For example, in the bar code shown in FIG. 6, the combination of four black bars and three white bars, interposed between adjacent black bars, represents one letter. The combination of the run lengths of the first letter is "0001011". The combination of the run lengths is collated with the data in the bar-code dictionary 18, thereby decoding the bar code (S44). For example, the combination "0001011" is decoded to a letter "C" based on the bar-code dictionary 18.

When the overall bar code is decoded through the above process, whether the bar code is correctly decoded is checked by means of the check code contained in the bar code (S45).

When the decode of the bar code by means of one scanning line is completed, the scanning line number counter "n" is replaced with "n+1" (S46). The counter is compared with the number L of the scanning lines to be processed (S47). As a result of the comparison, if "n" is equal to or smaller than "L", the processes S43 to S47 are repeated.

If "n" is greater than "L", the decode by means of all the scanning lines to be process has been completed and the bar-code identification results for the L-number of scanning lines have been obtained. The L-number of identification results are collated with one another, and the most frequent identification result is determined to be a final bar-code identification result for the bar-code field which has been processed (S48).

When the identification result for the b-th bar code field is obtained, the bar-code field counter "b" is replaced with "b+1" (S49), and the counter is compared with the number "B" of bar-code field candidates (S50). As a result of this comparison, if "b" is equal to or smaller than "B", the processes S41 to S50 are repeated. If "b" is greater than "B", the bar-code identifying process is terminated.

Figure 7:
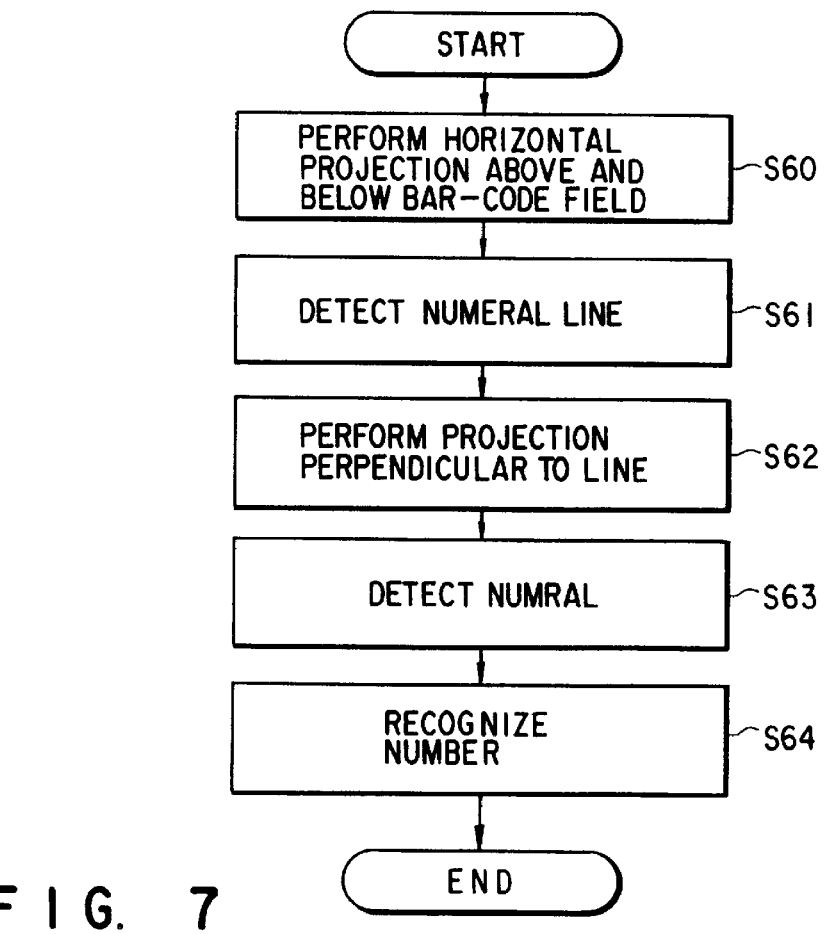
FIG. 7 is a flowchart for explaining a numeral identifying process.
Figure 8:
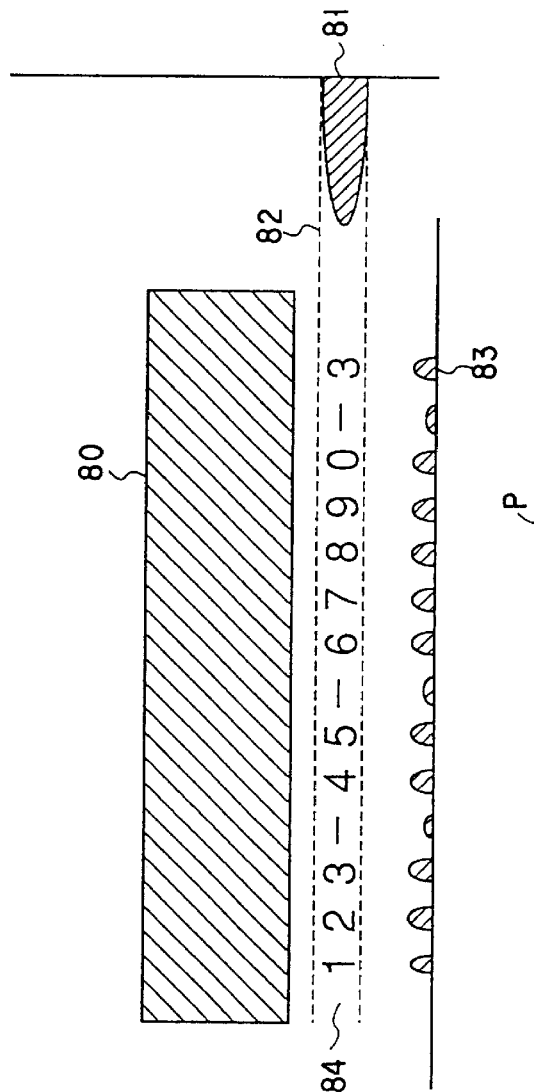
FIG. 8 is a diagram for explaining a numeral identifying process.

Along with the bar-code identifying process, a numeral adjacent to the bar code is recognized. FIG. 7 shows a flowchart of the numeral recognition process and FIG. 8 shows a state of numeral recognition.

First, with respect to a bar-code field 80 detected by the bar-code field detecting section 15, projection data 81 for regions above and under the longitudinal sides of the bar-code field 80, in the direction horizontal to the bar code (the direction parallel to the sides), are obtained (S60). A peak portion of the projection data 81, which exceeds a threshold value, is detected as a numeral line 82 (S61).

Then, projection data 83 in the direction perpendicular to the detected numeral line 82 is obtained (S62). Peak portions of the projection data 83 are obtained, so that individual numerals 84 can be separately detected (S63).

The numeral identifying section 20 collates the detected numerals 84, one by one, with the standard patterns stored in the numeral dictionary 21, and outputs the pattern most similar to a numeral 84 as a result of identifying the numeral (S64).

When all the numerals 84 have been identified, the identification result collating section 22 collates the bar-code identification result obtained by the bar-code identifying section 17 with the numeral identification result obtained by the numeral identifying section 20. If the former is equal to the latter, the result is output as the bar-code identification result. If not, the result is output as a reject.

In this manner, the bar-code identification result is judged with reference to the numeral identification result printed under the bar code, thereby improving the reliability of the bar-code identifying process.

Another embodiment of the present invention will be described.

Figure 9:
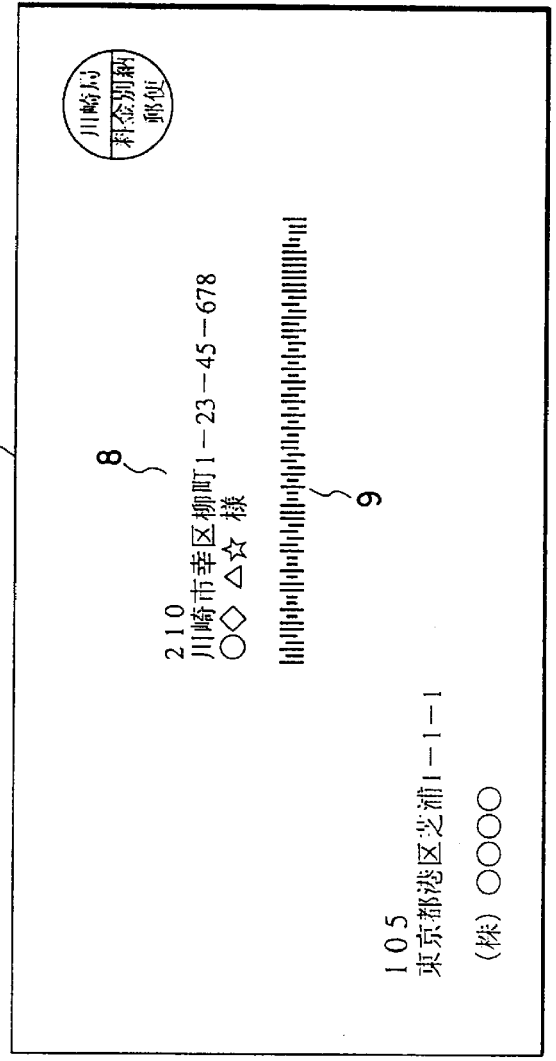
FIG. 9 is a diagram showing an example of mail according to another embodiment of the present invention.

As shown in FIG. 9, a bar code 9 corresponding to address data 8 is printed under the address data on a mail P. In the bar code 9, a bar is divided into three parts and information is given depending on whether the bar has a black run in either end part. Since the position of the bar code 9 on the mail P is not determined, a bar-code field must be detected prior to decoding the bar code 9.

The bar-code field is detected in the same manner as in the bar-code field detecting process in the above embodiment. More specifically, the overall image on the mail P is subjected to longitudinal and lateral differential processes, and the obtained longitudinal and lateral differential images are processed to binary images, which are then subjected to expanding and degenerating processes. As a result, a bar-code field is obtained as a continuous region.

Figure 10:
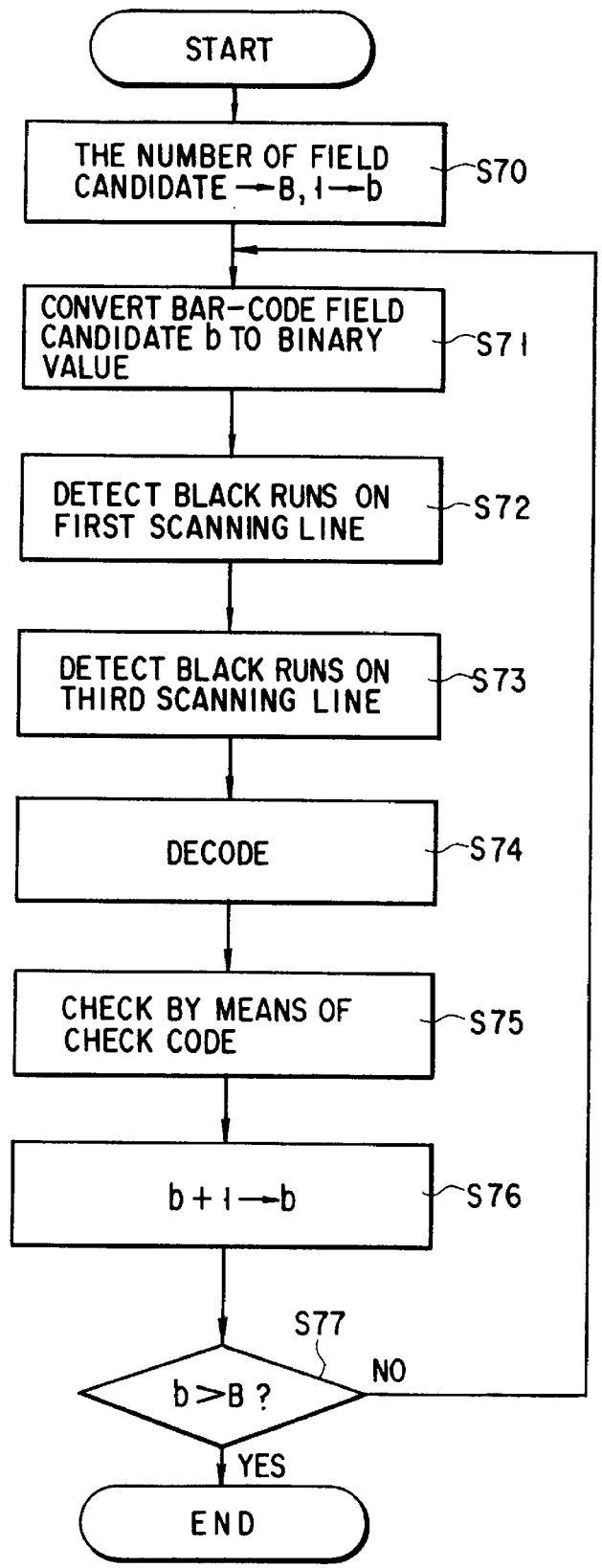
FIG. 10 is a flowchart for explaining a bar-code identifying process in the embodiment shown in FIG. 9.

A bar-code identifying process for the bar-code field thus obtained will be described in detail with reference to the flowchart shown in FIG. 10.

First, the number of bar-code field candidates detected by the bar-code field detecting section 15 is represented as "B" and the value of a bar-code field counter b is set to "1" (S70). Subsequently, with respect to a b-th candidate of the bar-code field detected by the bar-code field detecting section 15, a histogram of the density in the bar-code field is obtained. The density at the trough of the histogram is obtained as a binary threshold value. The image of the bar-code field candidate b is processed to a binary image (S71).

Figure 11:
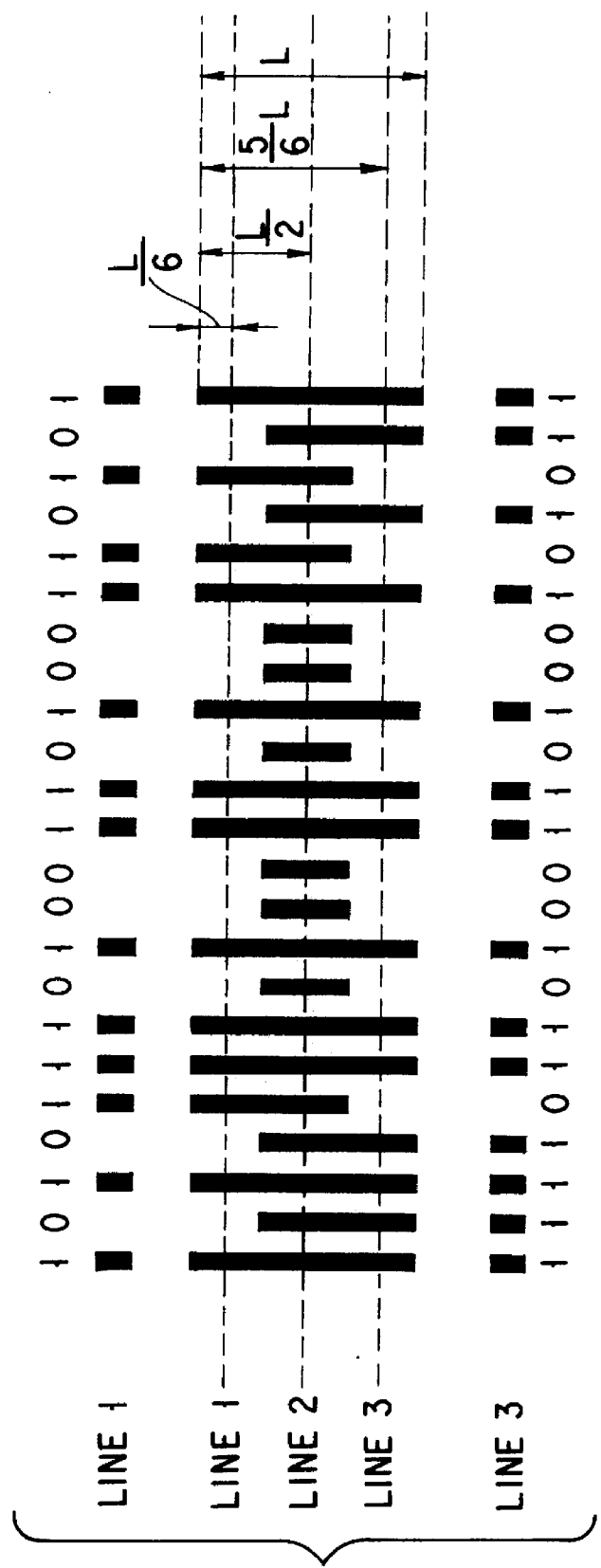
FIG. 11 is a flowchart for explaining the embodiment shown in FIG. 9.
Figures 12, 13:
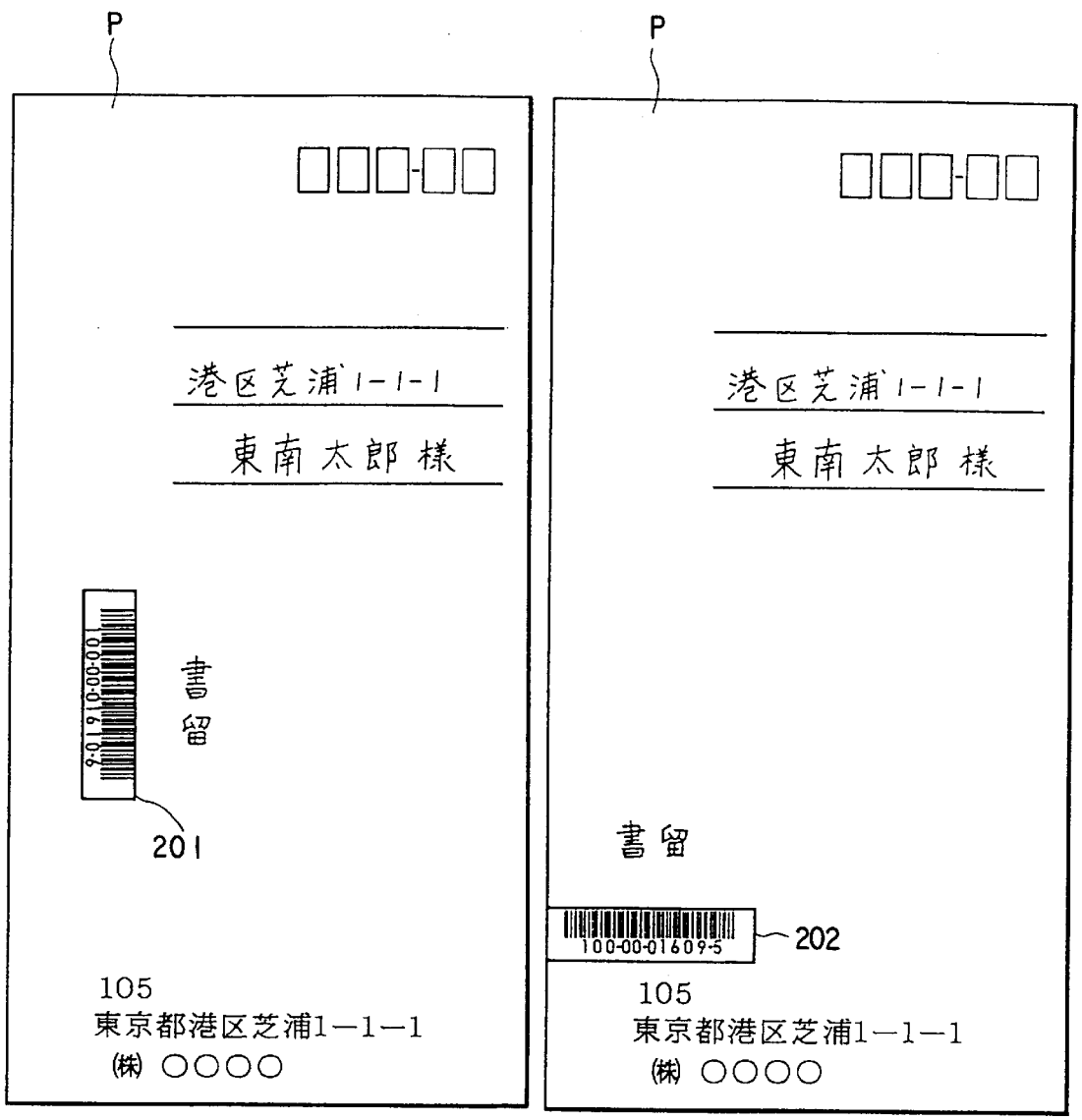
FIG. 12 is a diagram showing an example of mail on which a bar code is printed in the longitudinal direction.
FIG. 13 is a diagram showing an example of mail on which a bar code is printed in the lateral direction.

With regard to the binary image obtained in the process S71, assuming that the length of a long bar of the bar code is L, as shown in FIG. 11, the images at the positions to L/6, L/2 and 5L/6 are scanned. The scanning lines at the positions L/6, L/2 and 5L/6 are respectively referred to as first, second and third scanning lines.

First, black run regions on the first scanning line (line 1) are detected (S72). Similarly, black run regions on the third scanning line (line 3) are detected (S73). Based on the black runs detected by these processes (S72, S73), presence of a black run on the scanning line is determined to be "1" and absence thereof is determined to "0" (see FIG. 11).

The combination of "1" and "0" thus obtained is collated with the data stored in the bar-code dictionary 18, thereby decoding the bar code (S74). When the overall bar code is decoded through the above process S74, whether the bar code is correctly decoded is checked by means of the check code contained in the bar code (S75).

When the identification result for the b-th bar code field is obtained, the bar-code field counter "b" is replaced with "b+1" (S76), and the counter is compared with the number "B" of bar-code field candidates (S77). As a result of this comparison, if "b" is equal to or smaller than "B", the processes S71 to S77 are repeated. If "b" is greater than "B", the bar-code identifying process is terminated.

Thus, the present invention can be applied to various bar codes, for example, as shown in FIG. 9.

As has been described above, according to the embodiments of the present invention, images, which are obtained by differentiating an input image in longitudinal and lateral directions, are used to detect a bar-code field. As a result, a bar code on a mail P can be reliably detected, whether it extends in longitudinal or lateral direction.

In addition, a bar-code field can be easily detected by subjecting a differential image to expanding and degenerating processes. Further, even if a noise, such as a letter, is connected to a bar code, it can be separated at a high accuracy.

Moreover, when a bar-code image is processed to a binary value, a bar-code field candidate is first obtained, and thereafter, a binary threshold value for an image in the field is obtained. Therefore, an accurate binary threshold value can be obtained.

Further, since a bar code is identified by means of a plurality of scanning lines, the accuracy of the bar-code identifying process can be improved.

Furthermore, the identification result is checked by collating the result of the bar-code identification with the result of the recognition of a numeral indicated under the bar code and representing the content of the bar code. The reliability of the bar-code identification result is thus further increased.

Therefore, the bar-code field detection and the bar-code reading are performed at high speed and high accuracy.

As has been described above in detail, to read a bar code which may be attached to various positions on a document, the present invention provides a bar-code field detecting apparatus for detecting a bar-code field easily and reliably and a bar-code reading apparatus for reading a bar code at high speed and high accuracy by means of the field detection.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A bar-code field detecting apparatus comprising:

receiving means for receiving image data including a bar code;

first differential means for differentiating, in a first direction, the image data received by the receiving means so as to output a first differential image;

second differential means for differentiating, in a second direction perpendicular to the first direction, the image data received by the receiving means so as to output a second differential image;

first binary processing means for converting the first differential image to a first binary image by detecting a peak of the first differential image;

second binary processing means for converting the second differential image to a second binary image by detecting a peak of the second differential image;

first expanding means for expanding the first binary image in a direction perpendicular to the first binary image so as to transform the bar-code to a first black pixel rectangular field;

second expanding means for expanding the second binary image in a direction perpendicular to the second binary image so at to transform the bar-code to a second black pixel rectangular field;

first degenerating means for degenerating the first black pixel rectangular field by a predetermined amount so as to output a third black pixel rectangular field;

second degenerating means for degenerating the second black pixel rectangular field by a predetermined amount so as to output a fourth black pixel rectangular field; and means for detecting a position of the bar code based on the image data degenerated by the first and second degenerating means.

2. The bar-code field detecting apparatus according to claim 1, wherein the position detecting means detect a bar-code field on the basis of a size of the image expanded by the expanding means.

3. The bar-code reading apparatus according to claim 1, wherein the position detecting means include a bar-code dictionary.

4. The bar-code reading apparatus according to claim 1, further comprising numeral detecting means for detecting a numeral near the bar code.

5. The bar-code reading apparatus according to claim 4, wherein the numeral detecting means include a numeral dictionary.

6. The bar-code reading apparatus according to claim 4, further comprising means for collating the bar code read by the bar-code reading means with the numeral detected by the numeral detecting means.

7. The bar-code reading apparatus according to claim 1 further comprising a means for reading the bar-code based on the position detected by the position detecting means, said bar-code reading means including means for calculating a length of a run of the expanded image at the detected position of the bar-code.

8. The bar-code reading apparatus according to claim 1, wherein the position detecting means detect a bar-code field based on a size of the image expanded by the expanding means.

* * * * *